No. 769,147. PATENTED SEPT. 6, 1904.
J. B. BRUCKMILLER.
SEDIMENT REMOVING COMPOSITION.
APPLICATION FILED APR. 19, 1904.
NO MODEL.
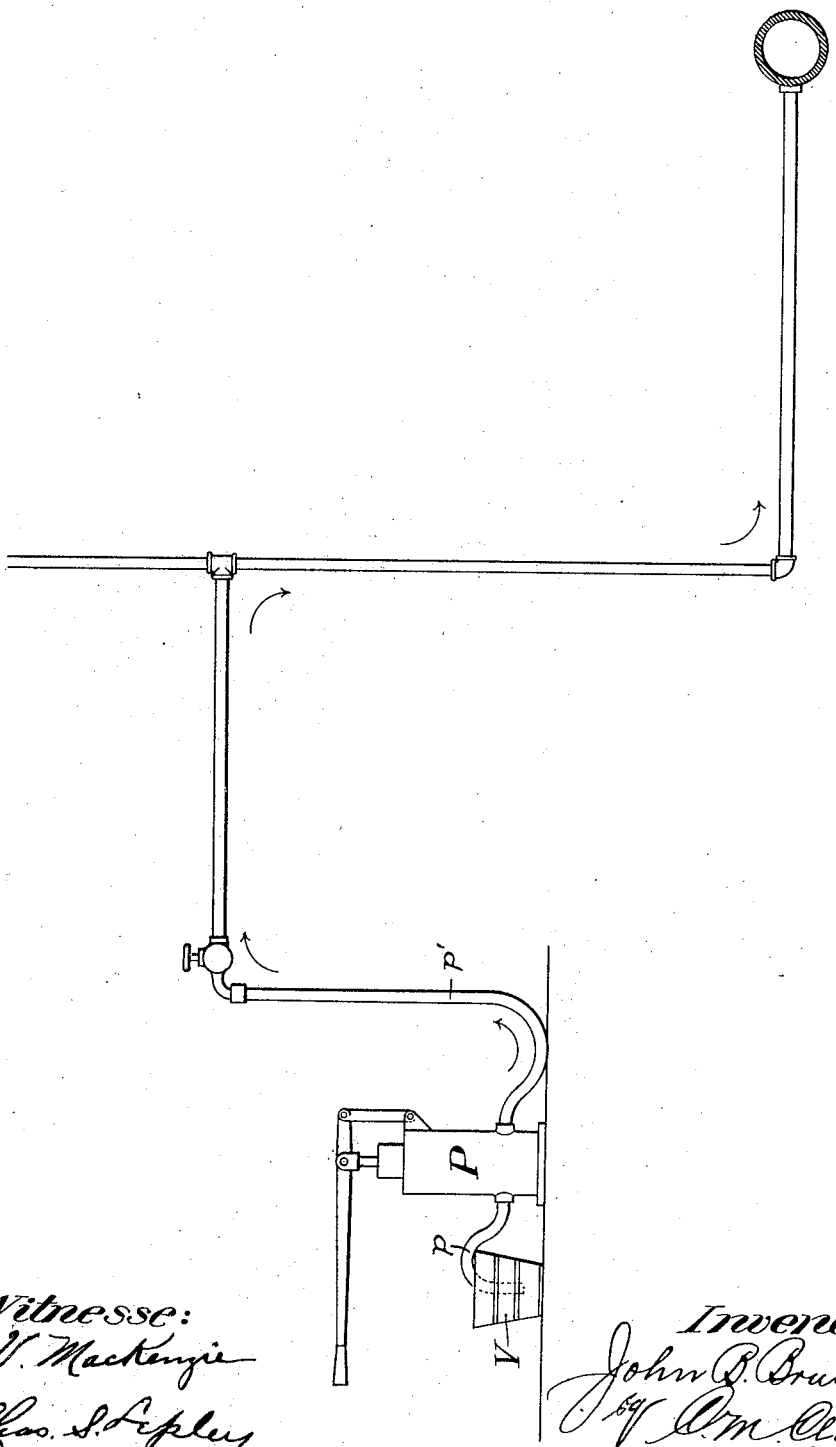
Witnesse:
E. V. Mackenzie
Chas. S. Ripley
Inventor:
John B. Bruckmiller
by O. M. Clarke
his attorney.

No. 769,147. Patented September 6, 1904.

UNITED STATES PATENT OFFICE.

JOHN B. BRUCKMILLER, OF McKEESPORT, PENNSYLVANIA.

SEDIMENT-REMOVING COMPOSITION.

SPECIFICATION forming part of Letters Patent No. 769,147, dated September 6, 1904.

Application filed April 19, 1904. Serial No. 203,826. (No specimens.)

*To all whom it may concern:*

Be it known that I, JOHN B. BRUCKMILLER, a citizen of the United States, residing at McKeesport, in the county of Allegheny and State of Pennsylvania, have invented a certain new and useful composition of matter to be used for removing the sediment or deposit on the interior of the service-pipes of water-supply systems, of which the following is a specification.

My composition consists of the following ingredients, combined in the proportions stated, viz: water, substantially pure, ten quarts; sulfuric acid, commercially pure, two quarts; turpentine, one pint; lye, twelve ounces. These ingredients are to be thoroughly mingled by agitation.

In using the above-named composition I employ a pump P, as shown in the accompanying diagram filed herewith, the inlet branch pipe $p$ of which is connected with a pail or other vessel V containing my improved mixture. The delivery branch pipe $p'$ of the pump is connected in any suitable manner with the delivery-terminal of the service-pipe—as, for instance, by screwing it upon or fastening it tightly against the delivery-faucet.

The mixture is especially adapted to remove the accumulation in the interior of the service-pipes without disconnecting or cutting off the main, and by the apparatus shown I forcibly pump the mixture through the service-pipes backwardly against the pressure of the water-main, first opening the outlet-faucet. When an amount of the mixture composed of the quantities of ingredients stated has been thus pumped or forced through the service-pipes, it operates upon the adhering matter and entirely removes it, carrying it backwardly into the main or allowing it to be discharged outwardly by removing the pump connection and opening the faucet.

What I claim, and desire to secure by Letters Patent, is—

1. The herein-described composition of matter for use in removing sediment, &c., from the interior of pipes or other vessels, resulting from a mixture of water, sulfuric acid, turpentine, and lye, substantially as herein described.

2. The herein-described composition of matter for removing sediment or deposited matter from the interior of the service-pipes of a water system, resulting from a mixture of the following ingredients in the proportions stated, to wit: water ten quarts, sulfuric acid two quarts, turpentine one pint, lye twelve ounces.

In testimony whereof I affix my signature in presence of two witnesses.

JOHN B. BRUCKMILLER.

Witnesses:
  GEO. B. HERWICK,
  I. S. STURTZ.